United States Patent [19]

Chen

[11] Patent Number: 5,697,808

[45] Date of Patent: Dec. 16, 1997

[54] BATTERY ADAPTER FOR ADAPTING A LARGE CAPACITY BATTERY TO A HAND PHONE

[75] Inventor: Tonny Chen, Changhua, Taiwan

[73] Assignee: E Lead Electronic Co., Ltd., Changhua, Taiwan

[21] Appl. No.: 593,679

[22] Filed: Feb. 29, 1996

[51] Int. Cl.[6] .................................................. H01R 3/00
[52] U.S. Cl. ........................................ 439/500; 429/121
[58] Field of Search .................................. 439/500, 502, 439/919, 929; 429/121

[56] References Cited

U.S. PATENT DOCUMENTS

| 4,431,245 | 2/1984 | Jigamian et al. | 439/929 |
|---|---|---|---|
| 5,136,229 | 8/1992 | Galvin | 439/929 |

Primary Examiner—Neil Abrams
Assistant Examiner—Brian J. Biggi
Attorney, Agent, or Firm—Browdy and Neimark

[57] ABSTRACT

A battery adapter for adapting a large capacity battery to a hand phone so as to supply power thereto in the case that the power of the hand phone battery is insufficient and it is impossible to charge the battery. The battery adapter includes an adapter and an imitative battery. The adapter has a mating face for mating with a large capacity battery. The mating face is disposed with more than one set of positive and negative electrodes connected to a lead wire. The lead wire extends from one side of the adapter to the imitative battery. The imitative battery has a shape similar to that of the battery for the hand phone and a mating face for mating with the hand phone. The mating face is disposed with several power terminals connected to the lead wire. When used, the large capacity battery is engaged on the mating face of the adapter and the imitative battery is engaged on the mating face of the hand phone so that the large capacity battery can supply power to the hand phone for long term of use.

4 Claims, 7 Drawing Sheets

BATTERY ADAPTER FOR ADAPTING A LARGE CAPACITY BATTERY TO A HAND PHONE

BACKGROUND OF THE INVENTION

The present invention relates to a battery adapter for adapting a large capacity battery to a hand phone so as to supply power therefor.

FIG. 1 shows a conventional hand phone 1 using a battery 2 with a small capacity of about 700 to 1200 microampere/hour. Please refer to FIG. 2. A conventional home video camera 3 uses a battery with a large capacity of about 2400 to 3200 microampere/hour. The large capacity battery has a capacity about three to four times that of the battery for a hand phone. Under the following conditions, a user of the hand phone must carry several batteries for the hand phone:

1. When the user needs to go out for two or three days, due to the inconvenience of charging, the user must carry several batteries for the hand phone. This is quite troublesome.

2. In the case that the user carries both a hand phone and a video camera and finds that the power for the hand phone is insufficient, the user cannot adapt the large capacity battery of the video camera to the hand phone.

SUMMARY OF THE INVENTION

It is therefore a primary object of the present invention to provide a battery adapter for adapting a large capacity battery to a hand phone so as to supply power thereto for long term of use. The battery adapter includes an adapter and an imitative battery connected with the adapter via a lead wire. In use, the large capacity battery is engaged on the mating face of the adapter and the imitative battery is engaged on the mating face of the hand phone so that the large capacity battery can supply power to the hand phone for long term of use and the communication is prevented from being interrupted.

The present invention can be best understood through the following description and accompanying drawings, wherein:

DETAILED DESCRIPTION OF THE PREFERRED EMBODIMENTS

Figure 1:
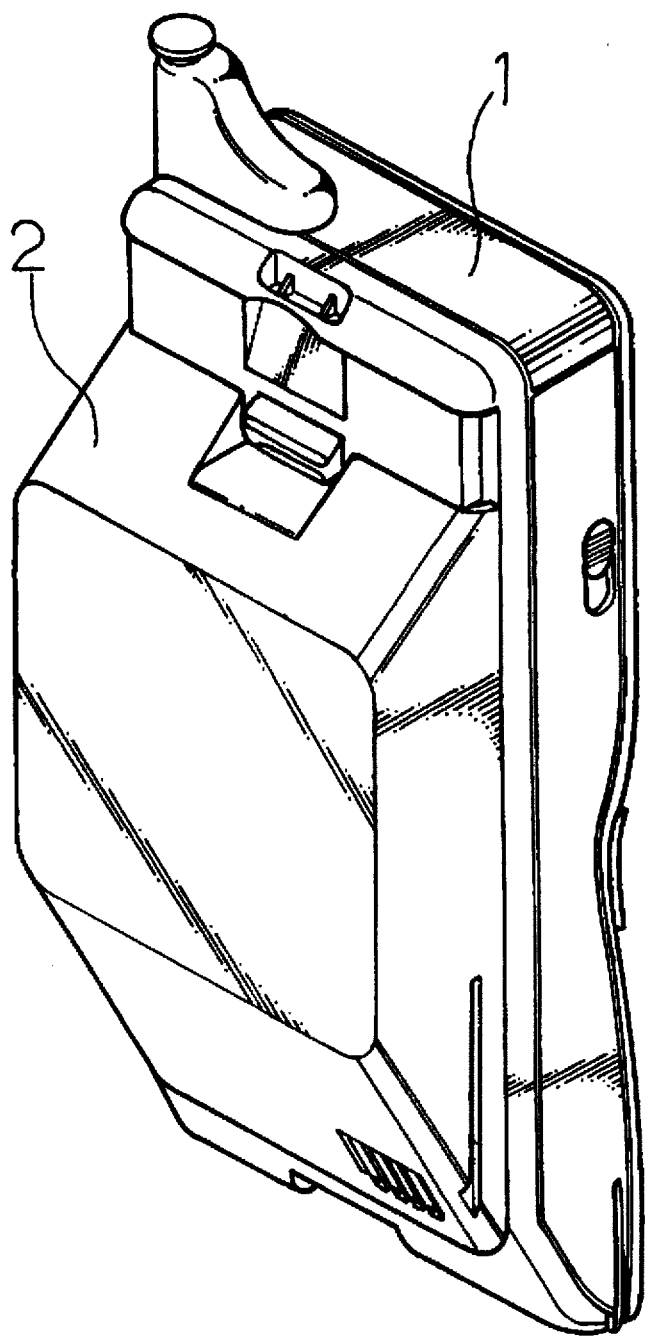
FIG. 1 is a perspective view of a conventional hand phone.
Figure 2:
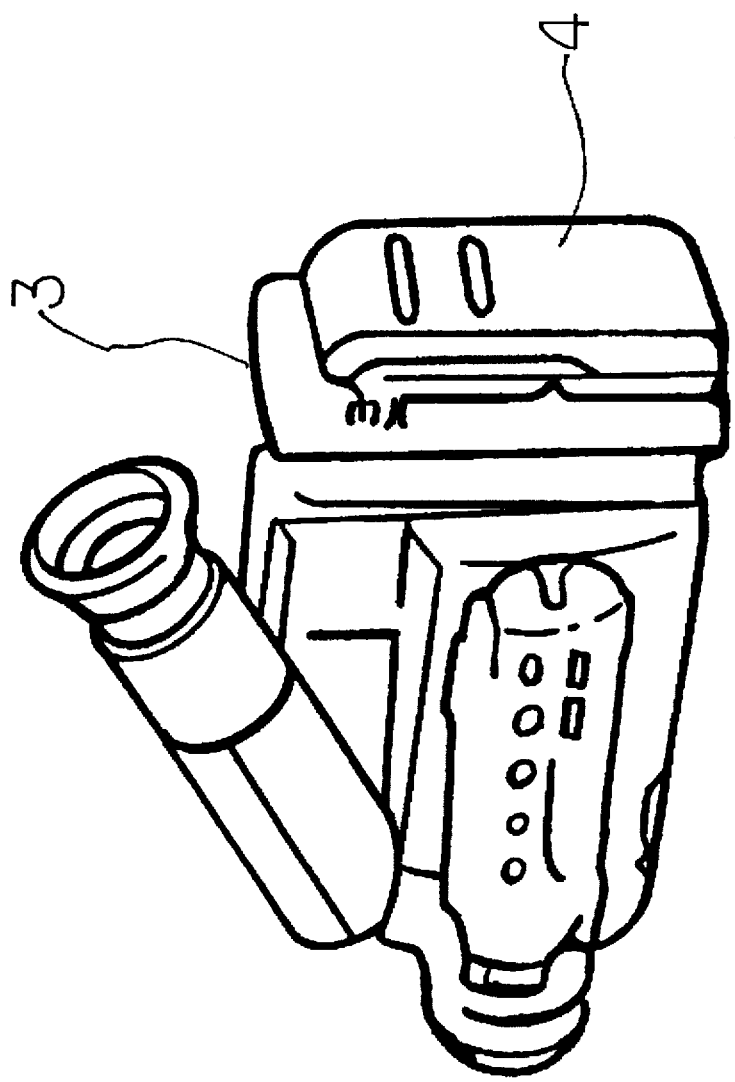
FIG. 2 is a perspective view of a home video camera.
Figure 3:
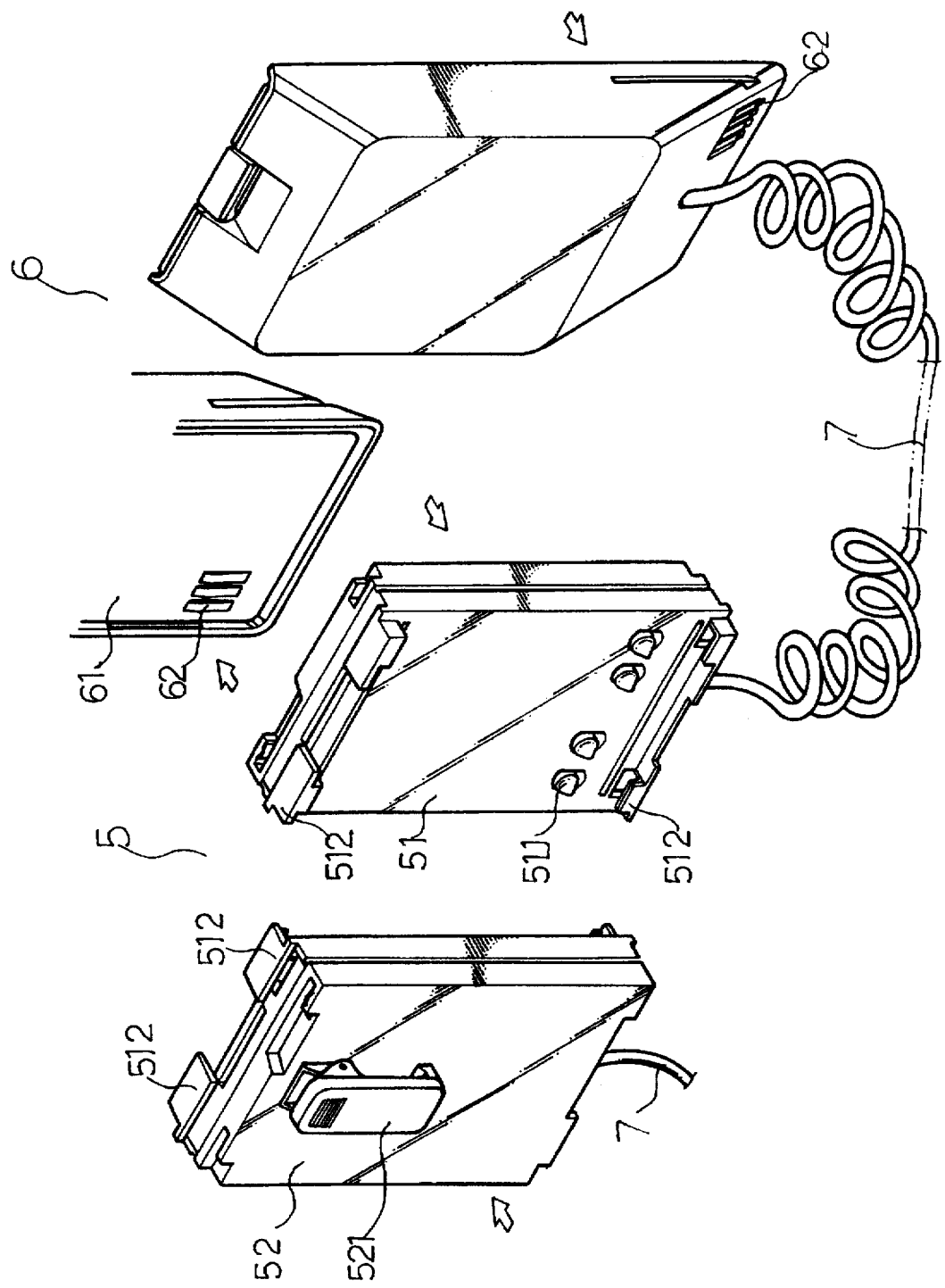
FIG. 3 is a perspective exploded view of the present invention.

Please refer to FIG. 3. The present invention includes an adapter 5 and an imitative battery 6.

The adapter 5 has a mating face 51 for mating with a large capacity battery 4. The mating face 51 is disposed with more than one set of positive and negative electrodes 511 connected to a lead wire 7. The lead wire 7 extends from one side of the adapter 5 to the imitative battery 6. Two resilient limitation plates 512 are disposed respectively on upper and lower edges of the mating face 51 for inserting into the limitation channels 41 of the large capacity battery 4. A belt clip 521 is disposed on a back face 52 of the adapter 5.

The imitative battery 6 has a shape similar to that of the battery 2 for the hand phone 1 and a mating face 61 for mating with the hand phone 1. The mating face 61 is disposed with several power terminals 62 connected to the lead wire 7.

Figure 4:
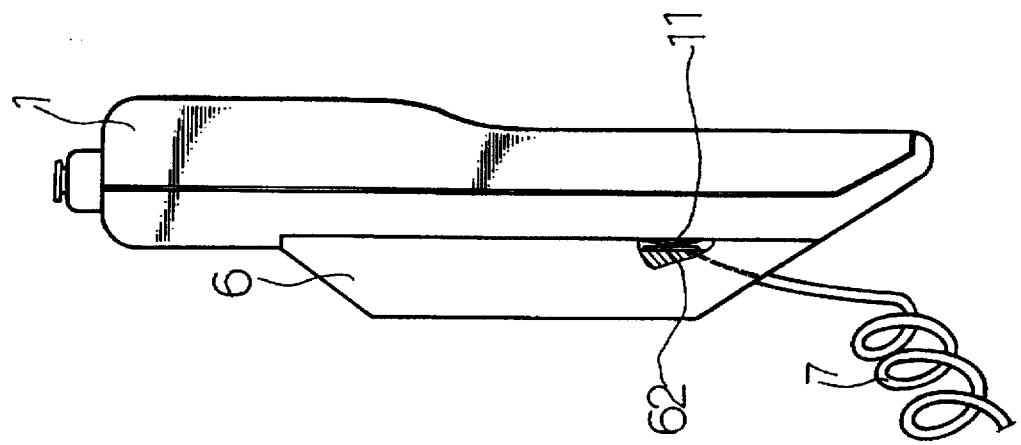
FIG. 4 is a side view showing the operation of the present invention.
Figure 4:
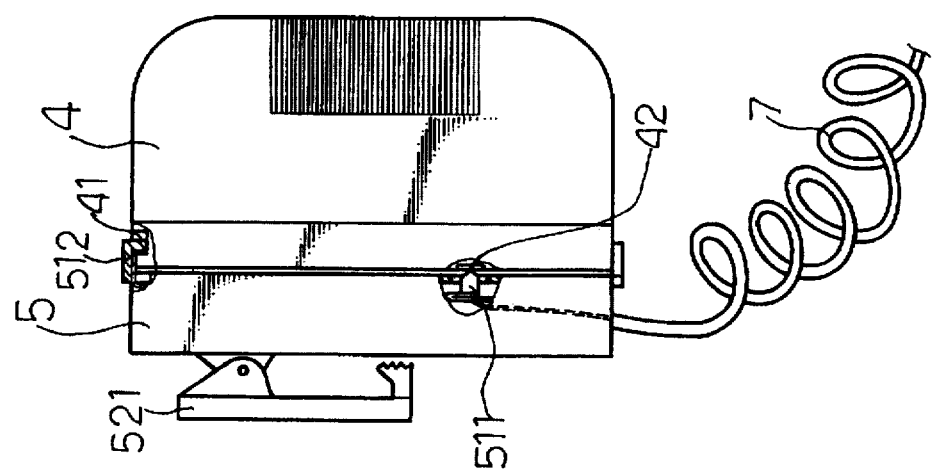
Figure 5:
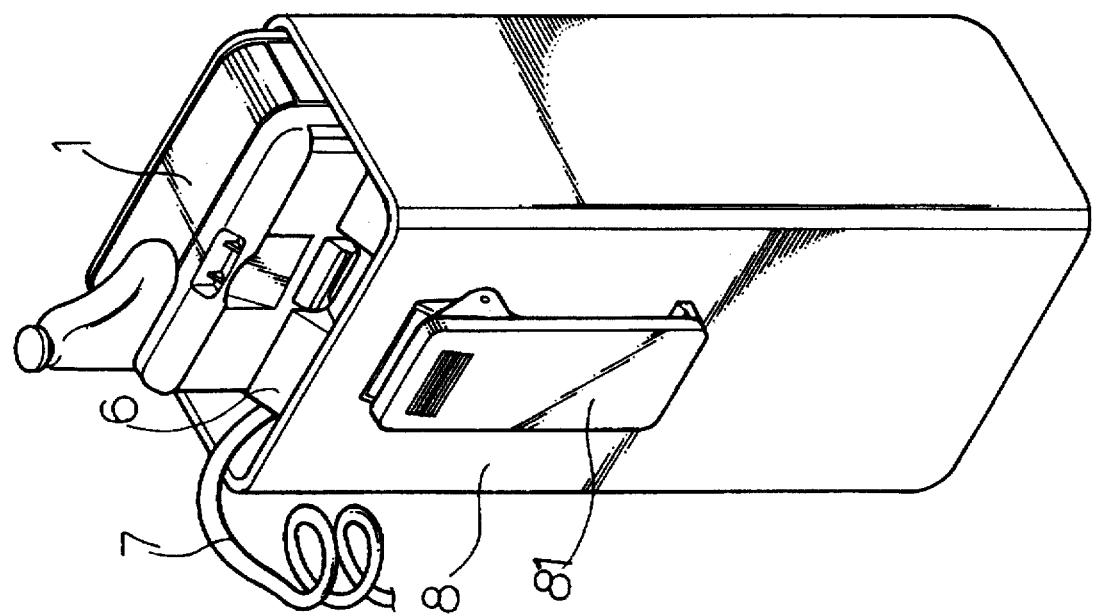
FIG. 5 is a perspective view showing the operation of the present invention.
Figure 5:
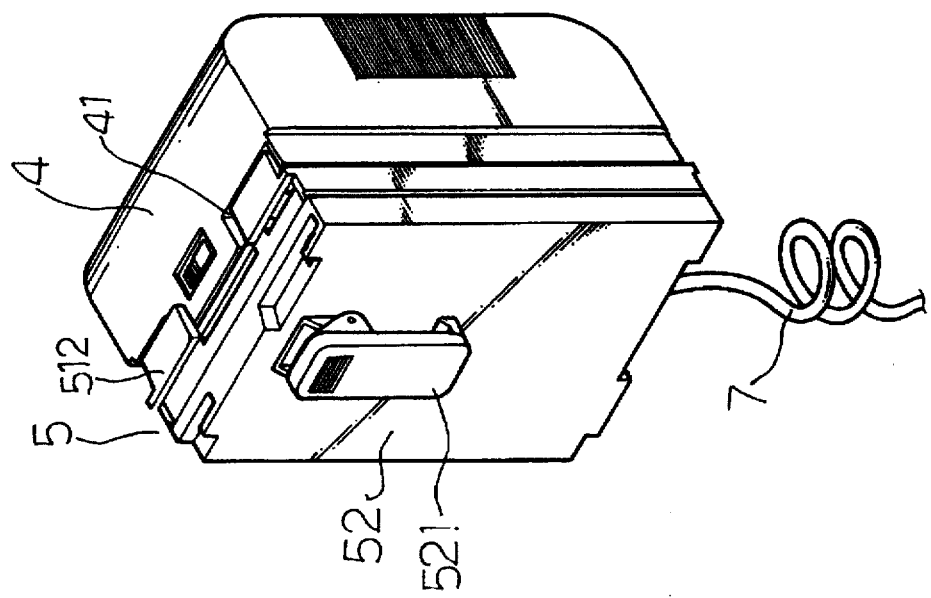
Figure 6:
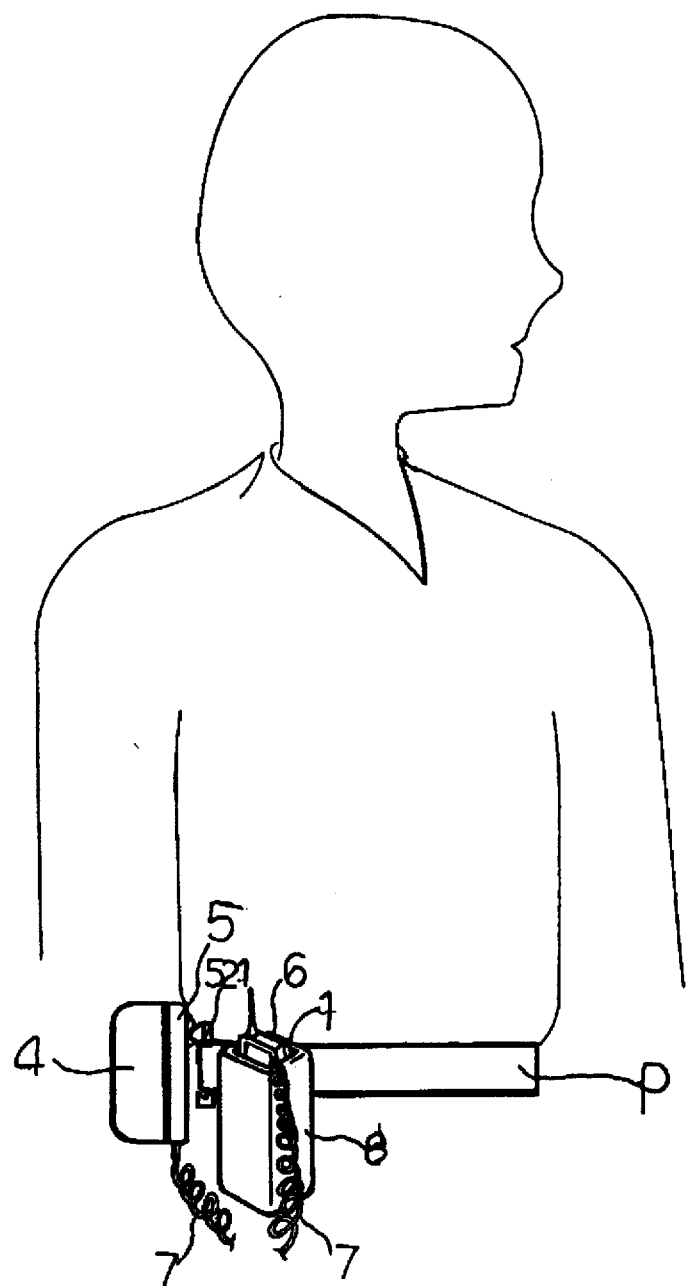
FIG. 6 shows the application of the present invention.

When using the present invention, as shown in FIGS. 4 and 5, the large capacity battery 4 is first placed on the mating face 51 of the adapter 5 and then inserted between the limitation plates 512 thereof with the limitation plates 512 engaged with the limitation channels 41 of the battery 4. At this time, the positive and negative electrodes 511 of the mating face 51 contact with the power terminals 42 of the battery 4 so that the power of the battery 4 is supplied from the power terminals 42 to the positive and negative electrodes 511 and then via the lead wire 7 to the power terminals 82 of the imitative battery 8 and the power terminals 11 of the hand phone 1. Therefore, the large capacity battery 4 can supply power to the hand phone 1 for long term of use. Referring to FIG. 5, when used, the hand phone 1 is first engaged with the imitative battery 6 and placed into an envelope 8 having a belt clip 81 on a back face for hanging the hand phone 1 on the user's belt P. The large capacity battery 4 is inserted between the limitation plates 511 of the mating face 51 of the adapter 5 and hung on the user's belt P by means of the belt clip 521 of the adapter 5 as shown in FIG. 6.

Figure 7:
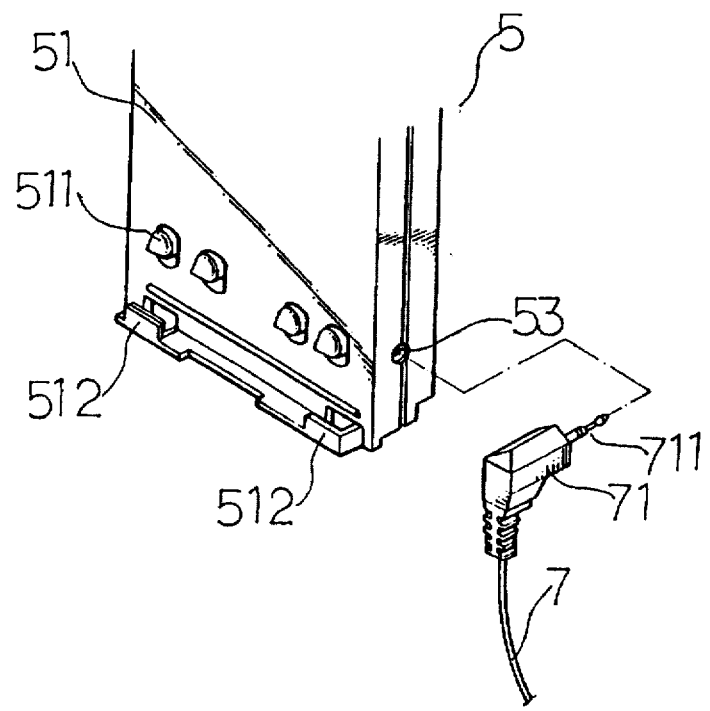
FIG. 7 shows another embodiment of the present invention.

Please refer to FIG. 7. A socket 53 can be formed on one side of the adapter 5 and the lead wire 7 can be equipped with a plug 71 having a terminal 711 for inserting into the socket 53 so as to electrically connect the adapter 5 with the lead wire 7 and facilitate storage of the present invention.

Figure 8:
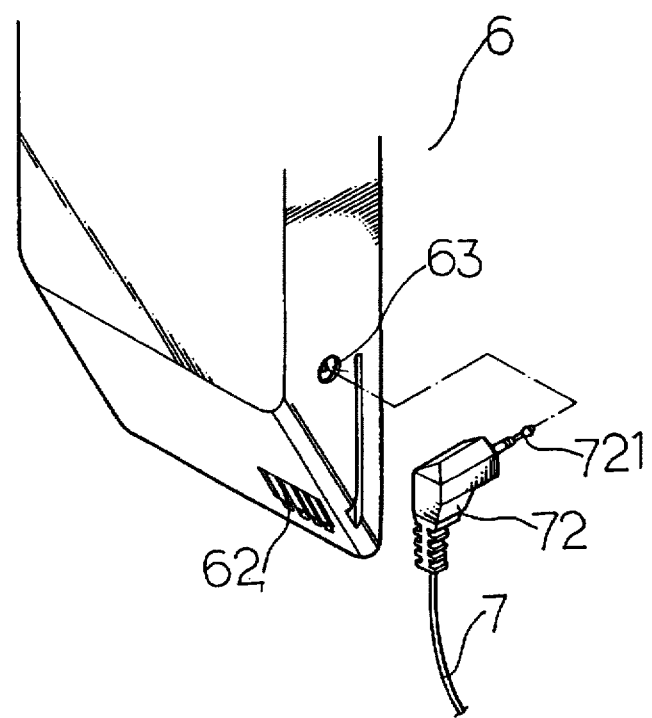
FIG. 8 shows still another embodiment of the present invention.

Please refer to FIG. 8. A socket 63 can be formed on one side of the imitative battery 6 and the lead wire 7 can be further equipped with a plug 72 having a terminal 721 at the other end for inserting into the socket 63 so as to electrically connect the imitative battery 6 with the lead wire 7 and facilitate storage of the present invention.

The above embodiments are only examples of the present invention and the scope of the present invention should not be limited to the examples. Any modification or variation derived from the examples should fall within the scope of the present invention.

What is claimed is:

1. A battery adapter for adapting a large capacity battery to a hand phone, said battery adapter comprising an adapter and an imitative battery, wherein:

the adapter has a mating face for mating with a large capacity battery, the mating face being disposed with more than one set of positive and negative electrodes connected to a lead wire, the lead wire extending from one side of the adapter to the imitative battery, two resilient limitation plates being disposed respectively on upper and lower edges of the mating face for inserting into limitation channels of the large capacity battery; and the imitative battery has a shape similar to that of the battery for the hand phone and a mating face for mating with the hand phone, the mating face being disposed with several power terminals connected to the lead wire.

2. A battery adapter as claimed in claim 1, wherein a clip member is disposed on a back face of the adapter for hanging the adapter on a user's belt.

3. A battery adapter as claimed in claim 1, wherein a socket is formed on one side of the adapter and the lead wire is equipped with a plug having a terminal at one end for inserting into the socket so as to electrically connect the adapter with the lead wire and facilitate storage thereof.

4. A battery adapter as claimed in claim 1, wherein a socket is formed on one side of the imitative battery and the lead wire is further equipped with a plug having a terminal at the other end for inserting into the socket so as to electrically connect the imitative battery with the lead wire and facilitate storage thereof.

* * * * *